United States Patent [19]

Howell et al.

[11] Patent Number: 5,658,426
[45] Date of Patent: Aug. 19, 1997

[54] ALKOXYLATED LANOLIN DERIVATIVES AS DEINKING AGENTS

[75] Inventors: Gail M. Howell, Fort Mill, S.C.; Jose M. Rodriguez, Sandersville, Ga.; Anthony B. Cook, Simpsonville, S.C.

[73] Assignee: Geo Specialty Chemicals, Inc., Cleveland, Ohio

[21] Appl. No.: 504,978

[22] Filed: Jul. 20, 1995

[51] Int. Cl.$^6$ .................................. D21C 5/02
[52] U.S. Cl. ........................................ 162/5
[58] Field of Search ............... 162/5, 4, 6; 510/174

[56] References Cited

U.S. PATENT DOCUMENTS

| | | | |
|---|---|---|---|
| 4,360,439 | 11/1982 | Calmanti et al. | 252/61 |
| 4,390,395 | 6/1983 | DeCeuster et al. | 162/5 |
| 4,416,727 | 11/1983 | Elton et al. | 162/6 |
| 4,690,821 | 9/1987 | Smith et al. | 424/401 |
| 4,964,949 | 10/1990 | Hamaguchi et al. | 162/5 |
| 5,100,574 | 3/1992 | Urushibata et al. | 510/174 |
| 5,227,019 | 7/1993 | Borchardt | 162/6 |
| 5,258,099 | 11/1993 | Borchardt | 162/5 |
| 5,288,369 | 2/1994 | Ishibashi et al. | 162/5 |
| 5,417,808 | 5/1995 | Okmoto et al. | 162/5 |
| 5,449,763 | 9/1995 | Wulff et al. | 536/18.6 |

FOREIGN PATENT DOCUMENTS

| | | | |
|---|---|---|---|
| 42 32 506 | 3/1994 | Germany | A61K 7/08 |
| 96/15314 | of 0000 | WIPO | D21C 5/02 |
| 91/14821 | 10/1991 | WIPO | D21C 5/02 |
| 94/07456 | 4/1994 | WIPO | A61K 7/06 |

Primary Examiner—Donald E. Czaja
Assistant Examiner—Jose A. Fortune
Attorney, Agent, or Firm—Thompson Hine & Flory LLP

[57] ABSTRACT

Deinking of printed paper is accomplished by repulping and defibering the printed paper in an alkaline aqueous medium containing a deinking composition to form an ink and pulp medium. The deinking composition is an alkoxylated lanolin derivative containing from about 55 to about 80% by weight of ethylene oxide and from about 15 to about 30% by weight of propylene oxide, based on the weight of the alkoxylated lanolin derivative.

6 Claims, 1 Drawing Sheet

ALKOXYLATED LANOLIN DERIVATIVES AS DEINKING AGENTS

FIELD OF THE INVENTION

This invention generally relates to a process and composition for regenerating wastepaper. More particularly, the use of alkoxylated lanolin derivatives as deinking chemicals in a flotation process results in the formation of secondary (recycled) fibers having a significantly increased degree of whiteness.

BACKGROUND OF THE INVENTION

In existing conventional plants for cleaning and bleaching of secondary fibers, such as salvaged old papers and other reused or recycled fiber-containing materials, these materials are collected and segregated in piles according to type, i.e., ledger, newspaper, cardboard, etc. The fiber materials from these piles are blended in a hydropulper, pulped and cleaned, followed when required by a cleaning step carried out by water washing or by flotation. The cleaned and deinked pulp, typically containing from 5 to 10% of the original ink present in the waste paper, is then directed to the bleach plant where it is subjected to one or more bleaching stages, each stage involving distinctly different treating chemicals and process conditions. The initial pulping and washing eliminates most of the contaminants, including ink, present in the fiber, and the subsequent bleaching stages brighten the pulp. The effectiveness of the pulp bleaching is measured and designated by parameters of brightness, contaminant count, and viscosity, which is a measure of pulp strength.

For the cleaning and bleaching of recycled waste paper and other secondary fiber materials, the most common practices employ chlorine-based chemicals, used primarily for fine papers, or hydrosulfite, used primarily for newspaper stock. Various treating sequences are utilized in the bleaching of the recycled pulp to attain desired brightness levels, typically above 76 brightness (GE) and commonly in the range of 78 to over 80% of the fine paper bleaching utilizes a CEH, CH, or H sequence. As commonly employed in the art these letter designations respectively stand for:

C=Chlorination with chlorine ($Cl_2$)

E=Alkali extraction with NaOH

H=Alkaline hypochlorite (NaOCl)

Concern over the negative impact on the environment of chlorine-based bleach plant effluents has accelerated in recent years, particularly since the discovery of the highly toxic chlorinated dioxins and furans in some bleach plant effluents, sludge, and pulp products. Today it is generally accepted that it is critical to reduce the amount of chloroorganics in pulp products and in the plant effluents.

Since formation of chlorinated organics is strongly related to the use and consumption level of molecular chlorine in the chlorination and hypochlorite stages of the conventional bleaching sequence, it is of great importance to significantly reduce the formation of chloro-organics by eliminating the chlorination and hypochlorite stages. Unlike the kraft paper industry (virgin wood processing), the recycled paper industry is only beginning to deal with the issue of chlorinated toxins including the initiation of projects involving the reduction, and preferably elimination, of chlorine and hypochlorite.

Most of the more common treating sequences employed or proposed for bleaching and delignifying of kraft pulp as well as those concerned with bleaching of secondary fibers are chlorine based.

U.S. Pat. No. 4,360,439 discloses a deinking agent composition comprising a salt of a fatty acid, a nonionic surfactant, an anionic surfactant, a sodium carboxycellulose, and an alkaline inorganic salt selected from the group consisting of metasilicate, disilicate, carbonate, borate, and polyphosphate. An improved washing process for deinking printed waste paper is also disclosed.

U.S. Pat. No. 4,390,395 describes a process for disintegrating waste paper to form pulp which comprises disintegrating wastepaper in the presence of an aqueous phase and a peroxide bleaching agent at a high consistency in the range of 22 to 45%. Surfactants are optionally added during the disintegration stage.

A method for the oxygen-alkali treatment of wastepaper containing wet strength resins is disclosed in U.S. Pat. No. 4,416,727. The oxygen-alkali treatment liberates fiber from the resin, and the fiber can be recycled to the papermaking process to make recycled paper products.

The claimed invention is primarily designed to be used in conjunction with the flotation method of deinking, although other methods as well may be employed. A modern deinking flotation system must fulfill two main requirements:

1) Brightness enhancements or gains, and

2) Increase the optical cleanliness.

In achieving the main requirements the additional goals for flotation deinking are to accomplish the above but doing so with low solids losses. Additional benefits of flotation deinking also include a reduction of "stickles" content.

Flotation deinking can only remove those ink particles that are referred to as "free"; that is, those ink particles that have been detached or removed from the fibers and are free in the suspension. With some waste papers, the flotation system may be split into what is referred to as pre-dispersion flotation and post-dispersion flotation. Dispersion is a mechanical process that releases additional ink particles from the fibers.

In processing waste paper with the foam flotation method, the stock suspension is comprised mainly of waste, fibers, ash and ink particles. The flotation method is used to selectively separate these ink particles from the suspension. In order to achieve efficient deinking, the ink particles must be separated from the fibers, in other words, they must be free to move in the suspension, and they must be hydrophobic.

In order for a flotation cell to operate correctly and perform its intended function, it is critical that the pulp slurry be prepared properly. Although there are various ways or means available to achieve the desired results, certain guidelines exist. In the case of flotation deinking, the pulp slurry should be of a uniform consistency, generally from 0.7 to 1.5% by weight of pulp depending on the design of the cell. Most flotation cells operate best with a constant feed flow, although some will tolerate a change in flow within a specified range. The pulp slurry should be well screened through small holes, and/or holes and slots in combination, to remove any large particles of debris that would potentially cause operational problems. A minimum amount of ash is also generally needed in the pulp slurry because of its ability in combination with flotation chemicals to enhance the ink removal in a flotation cell.

The chemicals used in the flotation system are of critical importance for the operation of the flotation cell. Types and amounts used typically vary depending on the characteristics of the inks present, the ash content of waste paper, and the location of flotation cells in the deinking system.

The present invention is directed to deinking agents generally referred to as "collector chemicals". As the name implies, collector chemicals are designed to bring together the ink particles that have been freed by the pulping action, such that they can be removed by the air bubbles. For ink removal to occur, the ink particles must come into contact with the collector chemicals, which in turn must come into contact with the air bubbles such that the ink agglomerates can be removed. The formulation of the collector chemicals helps to adjust the surface tension of the air bubbles to achieve this. One of the early downfalls of surfactants used for collector chemicals is that too high a portion thereof was carried over and began to build up into the backwater causing either too great or insufficient foam stability. This problem is detectable from a gradual decrease in brightness over a 36–72 hour period.

Collectors are typically made from naturally occurring materials such as fatty acid soaps; synthetics such as ethylene oxide or propylene oxide alkoxylates; and blends such as ethoxylated fatty acids. Fatty acid soaps are a type of surfactant. One of the most frequently cited reasons for not using fatty acid soaps is that calcium ions must be added. The concerns are not only that another tank and metering system must be added, and that calcium ions are believed to cause scaling and other deposits on the paper machine and within the deinking plant, but that high calcium ion levels contribute to stock loss. Therefore, it is a primary object of this invention to provide a deinking agent and process which provides increased secondary pulp brightness and decreased stock loss levels.

The present invention as disclosed and claimed herein offers an advanced method for the cleaning and brightening of secondary pulps which reduces the amount of subsequent bleaching using chlorine or hypochlorite required to produce recycled paper products having satisfactory brightness.

SUMMARY OF THE INVENTION

Other than in the operating examples, or where otherwise indicated, all numbers expressing quantities of ingredients or reaction conditions used herein are to be understood as modified in all instances by the term "about".

It has been found that the deinking of secondary fibers using alkoxylated lanolin derivatives results in the formation of paper pulp having a significantly increased degree of brightness, thus reducing the amount of post-bleaching required to produce paper of adequate brightness.

The present invention is directed to a deinking composition and process for deinking secondary fibers, the deinking composition comprising a mixture of alkoxylated lanolin derivatives. Lanolin is the unctuous secretion of the sebaceous glands of sheep which is deposited onto the wool fibers. Chemically, lanolin is a wax comprising a complex mixture of esters, di-esters and hydroxy esters of high molecular weight alcohols and high molecular weight acids. The lanolin alcohols comprise three major chemical groups; aliphatic alcohols, sterols and trimethyl sterols. The lanolin alcohols comprise about 25.8% aliphatic alcohols, about 38% cholesterol, 27.1% trimethyl sterols, 5.9% of hydrocarbons and undetermined products. The lanolin acids are made up of 4 types; normal, iso, anteiso, and hydroxy acids. The lanolin acids comprise 12.1% normal acids, 22.1% iso acids, 26.3% anteiso acids, 27.1% alpha hydroxy acids, 5.1% omega hydroxy acids, and 7.3% unknown acids.

The alkoxylated lanolin derivatives employed as deinking agents in this invention may contain from about 55 to about 80% by weight, preferably from about 60 to about 75% by weight, of ethylene oxide, and from about 15 to about 30% by weight, preferably from about 20 to about 25% by weight, of propylene oxide, based on the weight of the alkoxylated lanolin derivatives.

The present invention also provides a method of obtaining deinked secondary fibers having optimum brightness, the method comprising:

disintegrating wastepaper with an alkaline solution to produce an aqueous slurry of pulp fibers, adding a mixture of alkoxylated lanolin derivatives to the aqueous slurry of pulp fibers to remove the ink components from the waste paper, forcing air through the slurry so that it foams forming bubbles to which the ink particles adhere, and removing the foam from the slurry together with the ink particles.

DETAILED DESCRIPTION OF THE INVENTION

Figure 1:
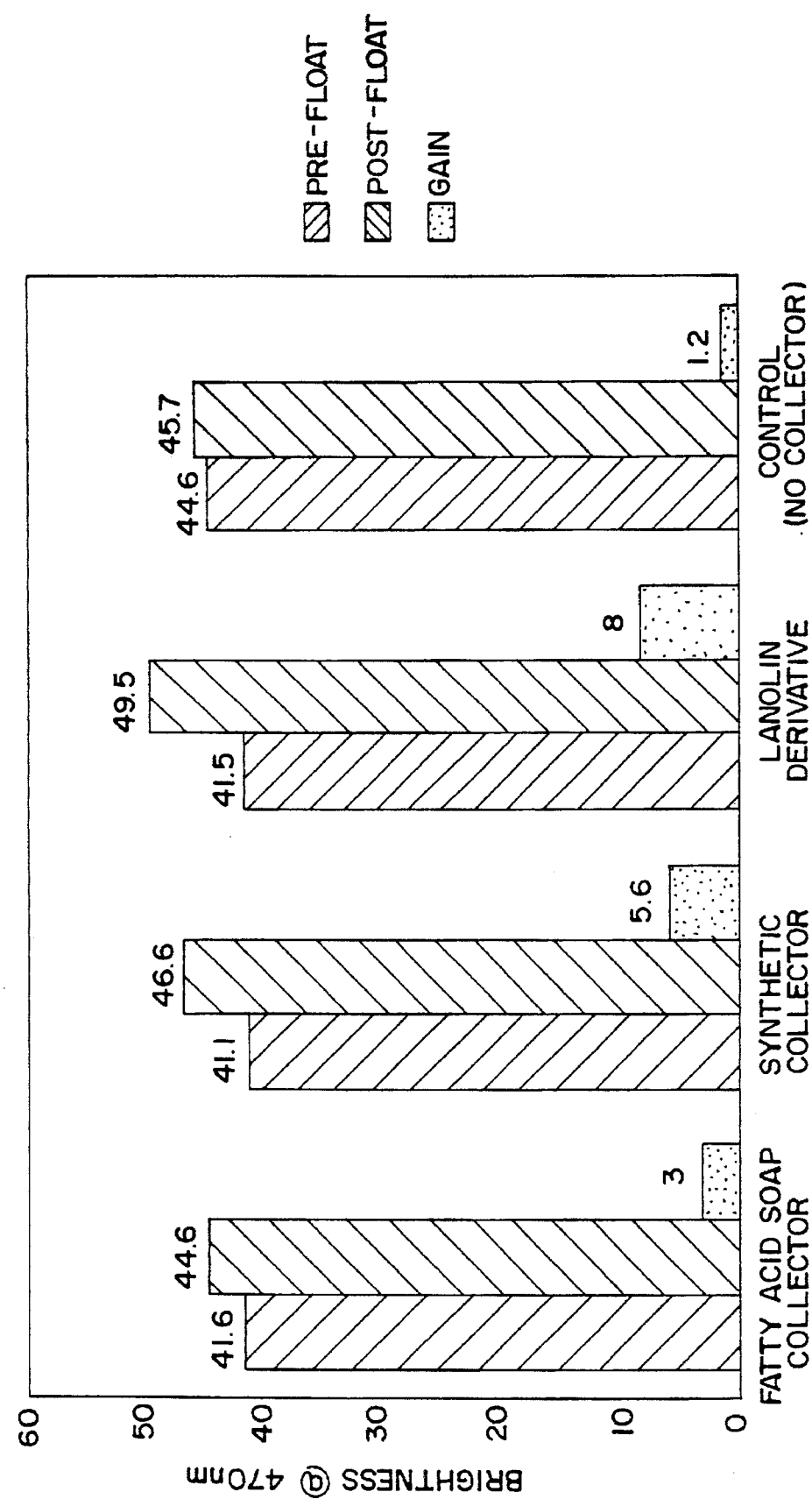
FIG. 1 is a bar graph comparing the brightness of pulp treated with typical deinking agents versus that of pulp treated with a deinking composition of this invention comprising an alkoxylated lanolin derivative.

In general, the deinking of wastepaper involves repulping and defibering printed paper in an alkaline aqueous medium containing the deinking composition of the present invention, which causes the ink particles to separate from the printed paper fibers to form an ink and pulp medium, and removal of the ink particles from the ink and pulp medium to produce a substantially ink-free pulp medium.

In accordance with this invention, the process conditions are controlled during contact with the deinking composition so that effective removal of the ink particles is accomplished. Concentrations of the deinking composition, the deinking additive, as well as the pH and temperature of the aqueous medium are adjusted to yield maximum removal of the ink particles. After removal of the ink particles, the substantially ink-free pulp medium has a brightness level sufficient to produce high-grade recyclable paper.

The deinking composition of the present invention functions as both a dispersant and collector of ink particles. During the repulping and defibering stage the deinking composition causes dispersion of the ink after allowing separation of the ink particles from the printed paper fibers. The composition functions as a collector of ink particles during the flotation procedure, whereby air is introduced into the ink and pulp medium causing air bubbles to carry the ink particles to the surface.

The deinking composition dosage of alkoxylated lanolin derivatives is generally in the range from about 0.2% to about 0.4% by weight, based on the dry weight of the wastepaper fibers. Process conditions are controlled during repulping so that effective removal of the ink particles is accomplished. The pH conditions under which the paper is to be repulped is from about 9 to about 11 when the pulp consistency of the slurry is about 4% to about 22% by weight.

In addition, the deinking composition may be used in the presence of other chemicals suitably employed in a deinking or papermaking process such as bleaching agents, defoamers, sizing agents, brighteners and water quality processing agents.

In another aspect of the invention there is provided a method for effectively deinking wastepaper in order to achieve optimum brightness of the resultant pulp. Wastepaper is repulped and defibered in an alkaline aqueous medium containing the alkoxylated lanolin derivatives employed as the deinking chemical. The presence of the alkoxylated lanolin derivatives causes separation of the ink particles from the printed paper fibers to form an ink and pulp medium. The ink and pulp medium is then passed through screens, or the like, to remove coarse and fine contaminants such as staples, dirt or other debris. Larger ink particles are then removed by a flotation procedure. According to the flotation procedure, air is pumped into the pulp slurry which causes a foam to be formed on top of the slurry. The separated ink particles attach themselves to the bubbles of the foam, thereby separating them from the deinked pulp. The foam, together with the ink particles is then removed from the slurry by mechanical means commonly used in the art. The deinking flotation step is generally carried out at about 0.5 to about 2.0%/wt. pulp consistency, a temperature of about 25° C. to about 60° C., preferably about 45° to 55° C., and pH of about 9 to about 11.

The ink and pulp medium may then undergo a series of additional cleaning procedures such as forward and reverse cleaning to remove heavier contaminants and lightweight contaminants, respectively. The pulp medium then typically undergoes a process known as washing to remove fine ink particles and increase the brightness of the pulp, and is followed by mechanical dispersion procedures which break down the remaining ink particles to particles below the size visible to the human eye. The resulting substantially ink-free pulp medium has a brightness level sufficient to produce a high-grade recyclable paper product by conventional papermaking techniques.

The following examples are illustrative of the deinking composition and process of the present invention and will be useful to one of ordinary skill in the art in practicing the invention. However, the invention is in no way limited by these examples.

In the examples, the following basic method was used to determine the efficacy of a deinking chemical to remove ink from recycled newsprint and magazines by flotation.

1. APPARATUS:
   Large capacity, cross direction paper shredder
   Denver flotation cell, Model 533000
   Laboratory pulper, Hobart Model N-50
   Laboratory disperger, Century Model SPB56
   Sheetforming apparatus, Ernst Haage, Model 20.12.BB1
   Brightness meter, Technidyne Brightimeter Micro S-5
   pH meter
   Oven, general purpose for drying set at 60° C.
   Water bath set 45° C.
   Balance, digital top loading
     capacity: 4000/400 gram
     readability: 0.1/0.01 gram
   Timer
   Vacuum filtration system with Buchner (Coors 60246) filter funnel
   Filter paper, qualitative grade, 15.0 cm
   Rubber spatulas
   4 L Stainless steel beaker with lid
   4 L plastic or glass beaker
   25 mL glass beakers
2. REAGENTS:
   Sodium Hydroxide, 50% w/w
   Sodium Silicate, 42° Be'Soln.
   Hydrogen Peroxide, 30%
   Hydrochloric Acid, 0.5N
   Tap water (<50 ppm hardness)
   Calcium Chloride, dihydrate, 1% solution
   Chelate dispersant based on phosphonic acids (Aquaquest®S540 available from Henkel Corp.)
3. STANDARDIZATION/CALIBRATION:
   To calibrate the brightness meter:
     place white, color standard over light source
     press calibrate
     choose 1—brightness & color
     press *
     load working standard
     press scan
     calibration complete
4. PROCEDURE:
1. Shred enough newsprint and magazines to ensure the sample is representative of the lot to be evaluated. Each flotation test requires 50 to 70 g of oven aged newsprint and 50 to 30 g magazine.
2. Oven age the shredded newsprint in a glass beaker at 60° C. for 72 hours covered with a watch glass. Final moisture should be approximately 6%.
3. Weight 30 g shredded magazine to a 4 L plastic beaker.
4. Add 70 g shredded, aged newsprint to the beaker containing magazine.
5. Weigh chemicals to be added to the pulper: (based on 100 g furnish)
   1.0% NaOH
   0.7% $NaSiO_3$
   0.2% chelate dispersant based on phosphonic acids (Securon®S540, Henkel Corp.)
   0.7% $H_2O_2$
   0.4% collector
6. Fill a squeeze bottle with 440 mL tap water @45° C. Add about half the amount of water in the squeeze bottle into the pulper. (≈22% consistency)
7. Add the chemicals weighed in Step #5 to the pulper in the order listed. Carefully rinse the beakers with the water in the squeeze bottle to accurately transfer contents of each beaker to the pulper. Attach the mixing blade and turn power on low to blend chemicals in the water.
8. With mixing, slowly add the 100 g shredded furnish to the pulper. Pulp on low setting for 15 min. Use the remaining water in the squeeze bottle to rinse the sides of the pulper clean of shredded paper during the pulping process.
9. Transfer the pulped furnish to the disperger. Add 2140 mL tap water @ 45° C. to the disperger. Deflake for 5 minutes @ 2000 rpm. (≈4% consistency)
10. Transfer the deflaked furnish to a stainless steel beaker. Cover and place the beaker in a water bath @ 45° C. for 90 minutes.
11. Add the contents of the beaker to the float cell reservoir. Lower the aerator to a level in the reservoir which mixes the suspension well. Fill reservoir with tap water @ 45° C. to a level just below the overflow lip (~9 L total ≈1% consistency). Include in the fill water, 100 mL of a 2% solution of $CaCl_2 \cdot 2H_2O$. Close the air supply to the aerator and allow the suspension to mix. Remove 500 mL of the suspension with a beaker to form a pre-float pad. Bring the level in the reservoir back up to just below the overflow lip. Open the air supply to the aerator to allow 100–110 L/h air flow @ 1500 rpm's.

12. Float for 8 minutes, using a rubber spatula to skim off the foam into the overflow chest.
13. Close the air supply and remove 500 mL of the suspension for the final pad. Turn off the aerator.
14. Pour the contents of the overflow chest into a graduate cylinder to measure the volume of the rejects before making a pad of the rejects.
15. Adjust the pH of the suspension samples to ~7–8 with 0.5N HCl. Make a pad from each suspension using the buchner funnel and filter paper. Carefully remove the filter paper from the pad.
16. Dry each pad (~5 min.) using the vacuum dryer on the sheetformer.
17. Read the brightness of the two suspension pads. Measure four readings on each side of each pad.

5. CALCULATIONS:

For Brightness Gain:

A=Average of 8 readings on pre-float suspension pad

B=Average of 8 readings on post-float suspension pad
Brightness Gain=B−A

*Note—it is important to run a blank test for comparison. Prepare a batch of furnish with chemicals in step #5, except substitute water for the collector. Continue through the remainder of the procedure.

EXAMPLES

The following examples compare the effectiveness of various deinking compositions for the removal of ink particles from an ink and pulp medium during the flotation step of the invention.

Newspapers were cut into pieces and placed in a bench pulper to which were added about 1% by weight sodium hydroxide, about 0.7% by weight of 40° Baumé sodium silicate, about 2% by weight of a 30% aqueous solution of hydrogen peroxide and about 0.2% by weight of a deinking composition as indicated in FIG. 1, based on the weight of the wastepaper, and then warm water so that the resultant aqueous slurry contained the waste paper in an amount of about 22% by weight. The waste paper was then pulped at 45° C.–55° C. for about 15 minutes at a pH of about 10. The resultant pulp slurry was diluted to a pulp concentration of about 1% by weight and then the flotation treatment was carried out at 30° C. for 10 minutes with the use of a testing floatator.

The resultant pulp slurry was formed into a sheet having a weight of about 150 g/m² using a standard type sheeting machine. The brightness of the sheet was measured with a Technidyne Brightimeter @ 470 nm..

The results are summarized in FIG. 1. The deinking compositions graphically illustrated in FIG. 1 were 1) fatty acid soap, 2) condensate of ethoxylated (40 moles E.O.) sorbitol and epoxidized soybean oil referred to as synthetic collector, 3) alkoxylated (65 moles ethylene oxide and 12 moles propylene oxide) lanolin oil referred to as lanolin derivative available under the tradename Lantrol 1692 AWS from Henkel Corporation, Emery Division, Cincinnati, Ohio, and 4) control (no deinking collector).

As seen in FIG. 1, the alkoxylated lanolin derivative deinking agent and the method of the invention provide deinked pulp having a higher degree of brightness than conventional deinking agents and methods. That is, the alkoxylated lanolin derivative deinking agent provided the highest brightness gain (8) of the deinking compositions.

It will be recognized by those skilled in the art that the invention has wide application in the production of recyclable grade paper.

Numerous modifications are possible in light of the above disclosure such as alternative process parameters which may be employed in the invention using the deinking agent with no pH adjustment to the wastepaper; using the deinking agent in an alkaline pH range; or using the deinking agent in the presence of other chemicals suitably employed in a deinking and/or papermaking process such as bleaching agents, defoamers, sizing agents, brighteners, and water quality processing agents among others.

Therefore, although the invention has been described with reference to certain preferred embodiments, it will be appreciated that other composite structures and processes for their fabrication may be devised, which are nevertheless within the scope and spirit of the invention as defined in the claims appended hereto.

What is claimed is:

1. A method of deinking wastepaper for reclamation thereof, comprising disintegrating wastepaper with an alkaline solution to produce an aqueous slurry of pulp fibers in the presence of alkoxylated lanolin derivatives containing from about 55 to about 80% by weight of ethylene oxide and from about 15 to about 30% by weight of propylene oxide, based on the weight of said alkoxylated lanolin derivatives, forcing air through said slurry to form foam to which the ink particles adhere, and removing the foam from the slurry together with the ink particles.

2. The method of claim 1 wherein said alkoxylated lanolin derivatives contain from about 60 to about 75% by weight of ethylene oxide and from about 20 to about 25% by weight of propylene oxide.

3. The method of claim 1 wherein said alkoxylated lanolin derivatives are present in the amount of from about 0.2 to about 0.4% by weight, based on the weight of wastepaper.

4. The method of claim 1 wherein said alkaline solution is maintained at a pH in the range of about 9 to about 11 and at a temperature in the range of from about 25 to about 60° C.

5. The method of claim 1 wherein said alkaline solution further contains a bleaching agent, defoamer, sizing agent, brightener and water quality processing agent.

6. The method of claim 1 further comprising treating the disintegrated wastepaper with one or more steps selected from the group consisting of cleaning, flotation, washing, dispersion and bleaching.

* * * * *